(12) United States Patent
Jung et al.

(10) Patent No.: US 10,086,678 B2
(45) Date of Patent: Oct. 2, 2018

(54) METHOD AND APPARATUS FOR CONTROLLING COMPRESSOR

(71) Applicants: Hyundai Motor Company, Seoul (KR); Kia Motors Corporation, Seoul (KR)

(72) Inventors: Tae Hun Jung, Seoul (KR); Young Jun Kim, Gyeonggi-do (KR); Jeong Sik Seo, Gyeonggi-Do (KR); Jaeyeon Moon, Seoul (KR); Hyuck Yong Kwon, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/166,522

(22) Filed: May 27, 2016

(65) Prior Publication Data
US 2017/0166034 A1    Jun. 15, 2017

(30) Foreign Application Priority Data
Dec. 11, 2015    (KR) .................. 10-2015-0177474

(51) Int. Cl.
*B60H 1/32*    (2006.01)
*B60H 1/00*    (2006.01)

(52) U.S. Cl.
CPC ......... *B60H 1/3208* (2013.01); *B60H 1/0045* (2013.01); *B60H 1/00764* (2013.01);
(Continued)

(58) Field of Classification Search
CPC . B60H 1/3208; B60H 1/0045; B60H 1/00764
See application file for complete search history.

(56) References Cited

U.S. PATENT DOCUMENTS

| | | | | |
|---|---|---|---|---|
| 2002/0143455 A1* | 10/2002 | Bidner | ................... | B60K 28/16 701/69 |
| 2012/0153711 A1* | 6/2012 | Minato | ................. | B60T 13/662 303/10 |
| 2015/0168042 A1* | 6/2015 | Goel | ..................... | F25B 49/022 62/115 |

FOREIGN PATENT DOCUMENTS

| | | |
|---|---|---|
| DE | 102007030954 A1 | 1/2008 |
| EP | 1700725 A1 | 9/2006 |

(Continued)

OTHER PUBLICATIONS

European Search Report for European Patent Application No. 16175930.3; dated May 12, 2017, 7 pages.

*Primary Examiner* — Jerrah Edwards
*Assistant Examiner* — Mathew Franklin Gordon
(74) *Attorney, Agent, or Firm* — Mintz Levin Cohn Ferris Glovsky and Popeo, P.C.; Peter F. Corless (57) ABSTRACT

A method and an apparatus for controlling a compressor are provided. The method includes measuring a vehicle speed, an engine speed, a position value of an accelerator pedal, and an external air temperature and comparing the vehicle speed with a predetermined speed. A basic operation rate of the compressor is then determined based on the engine speed and the position value of the accelerator pedal when the vehicle speed is equal to or less than the predetermined speed. A final operation rate of the compressor is determined based on the external air temperature and the determined basic operation rate and the compressor is operated based on the determined final operation rate.

11 Claims, 4 Drawing Sheets

(52) U.S. Cl.
CPC .......... *B60H 2001/327* (2013.01); *B60H 2001/3266* (2013.01); *B60H 2001/3275* (2013.01)

(56) References Cited

FOREIGN PATENT DOCUMENTS

| | | |
|---|---|---|
| EP | 1897712 A2 | 3/2008 |
| JP | 2011-111140 A | 6/2011 |
| KR | 10-2009-0019622 A | 2/2009 |
| KR | 10-2010-0092720 A | 8/2010 |
| KR | 10-2012-0062412 A | 6/2012 |
| KR | 10-2013-0088258 A | 8/2013 |

\* cited by examiner

Map2

| Position value of accelerator pedal | Basic operation rate |
|---|---|
| 0 % | 100 |
| 25 % | 100 |
| 40 % | 100 |
| 50 % | 100 |
| 70 % | 100 |
| 80 % | 50 |
| 90 % | 35 |

METHOD AND APPARATUS FOR CONTROLLING COMPRESSOR

CROSS-REFERENCE TO RELATED APPLICATION

This application claims priority to and the benefit of Korean Patent Application No. 10-2015-0177474 filed in the Korean Intellectual Property Office on Dec. 11, 2015, the entire contents of which are incorporated herein by reference.

BACKGROUND (a) Field of the Invention

The present invention relates to a method and an apparatus for controlling a compressor, and more particularly, to a method and apparatus for controlling a compressor and expanding an operation range of the compressor to improve fuel efficiency of a vehicle.

(b) Description of the Related Art

Recently, exhaust regulations and fuel efficiency regulations have become more stringent to retard progress of global warming and to mitigation potential depletion of petroleum resources. To enhance fuel efficiency, improvement of auxiliary machinery such as an air conditioning system is required. The air conditioning system includes a compressor, an evaporator, and a condenser. The compressor is configured to compress a refrigerant that flows in from the evaporator, and then discharge the compressed refrigerant to the condenser. The compressor is further configured to receive power of an engine.

According the related art, the compressor is operated by a heater controller based on an external air temperature of a vehicle. Since a substantial amount of power of the engine is consumed when a position value of an accelerator pedal is greater than or equal to a predetermined value, an engine controller stops operation of the compressor. In other words, the engine controller has a priority related to a stopping operation of the compressor.

According to the related art, even when the external air temperature is high, the compressor may be stopped, and thus cooling performance of the air conditioning system may deteriorate. In addition, when the position value of the accelerator pedal is less than the predetermined value, the heater controller is configured to operate the compressor based only the external air temperature without considering the position value of the accelerator pedal, and thus power of the engine for driving the vehicle may become insufficient.

The above information disclosed in this section is merely for enhancement of understanding of the background of the invention and therefore it may contain information that does not form the prior art that is already known in this country to a person of ordinary skill in the art.

SUMMARY

The present invention provides a method and an apparatus for controlling a compressor having advantages of expanding an operation range of the compressor and improving fuel efficiency of a vehicle.

A method for controlling a compressor according to an exemplary embodiment of the present invention may include: measuring a vehicle speed, an engine speed, a position value of an accelerator pedal, and an external air temperature; comparing the vehicle speed with a predetermined speed; determining a basic operation rate of the compressor based on the engine speed and the position value of the accelerator pedal when the vehicle speed is equal to or less than the predetermined speed; determining a final operation rate of the compressor based on the external air temperature and the determined basic operation rate; and operating the compressor based on the determined final operation rate.

The method may further include determining the basic operation rate of the compressor based on the position value of the accelerator pedal when the vehicle speed is greater than the predetermined speed. In the determination of the basic operation rate of the compressor based on the engine speed and the position value of the accelerator pedal when the vehicle speed is equal to or less than to the predetermined speed, the basic operation rate of the compressor may be determined using a first operation rate map in which the basic operation rate based on the engine speed and the position value of the accelerator pedal may be set.

The first operation rate map may include a plurality of sub-regions including a first sub-region, a second sub-region, and a third sub-region, and the basic operation rate of the compressor may be determined as a maximum operation rate of the compressor when the engine speed and the position value of the accelerator pedal correspond to the first sub-region. The basic operation rate of the compressor may be determined as a value between the maximum operation rate and a minimum operation rate of the compressor when the engine speed and the position value of the accelerator pedal correspond to the second sub-region. The basic operation rate of the compressor may be determined as a minimum operation rate of the compressor when the engine speed and the position value of the accelerator pedal correspond to the third sub-region.

Additionally, the determination of the final operation rate of the compressor based on the external air temperature and the determined basic operation rate may include determining whether the external air temperature is within a predetermined temperature range; and determining the final operation rate of the compressor as the determined basic operation rate when the external air temperature is within the predetermined temperature range.

The determination of the final operation rate of the compressor based on the external air temperature and the determined basic operation rate may include: determining a correction coefficient based on the external air temperature when the external air temperature is beyond the predetermined temperature range; and determining the final operation rate of the compressor by applying the determined correction coefficient to the determined basic operation rate. The correction coefficient may be set to a value that increases as the external air temperature increases.

An apparatus for controlling a compressor according to an exemplary embodiment of the present invention may include: a vehicle speed sensor configured to measure a vehicle speed; an engine speed sensor configured to measure an engine speed; an accelerator pedal position sensor configured to measure a position value of an accelerator pedal; an external air temperature sensor configured to measure an external air temperature; and a controller configured to operate the compressor based on signals of the vehicle speed sensor, the engine speed sensor, the accelerator pedal position sensor, and the external air temperature sensor.

In particular, the controller may be configured to determine a basic operation rate of the compressor based on the engine speed and the position value of the accelerator pedal when the vehicle speed is equal to or less than a predetermined speed, may be configured to determine a final operation rate of the compressor based on the external air temperature and the determined basic operation rate, and may be configured to operate the compressor based on the determined final operation rate.

Further, the controller may be configured to determine the basic operation rate of the compressor based on the position value of the accelerator pedal when the vehicle speed is greater than the predetermined speed and determine the basic operation rate of the compressor using a first operation rate map in which the basic operation rate based on the engine speed and the position value of the accelerator pedal may be set.

The first operation rate map may include a plurality of sub-regions including a first sub-region, a second sub-region, and a third sub-region, and the controller may be configured to determine the basic operation rate of the compressor as a maximum operation rate of the compressor when the engine speed and the position value of the accelerator pedal correspond to the first sub-region. The controller may also be configured to determine the basic operation rate of the compressor as a value between the maximum operation rate and a minimum operation rate of the compressor when the engine speed and the position value of the accelerator pedal correspond to the second sub-region. The controller may be configured to determine the basic operation rate of the compressor as a minimum operation rate of the compressor when the engine speed and the position value of the accelerator pedal correspond to the third sub-region.

Further, the controller may be configured to determine whether the external air temperature is within a predetermined temperature range, and determine the final operation rate of the compressor as the determined basic operation rate when the external air temperature is within the predetermined temperature range. The controller may also be configured to determine a correction coefficient based on the external air temperature when the external air temperature is beyond the predetermined temperature range, and determine the final operation rate of the compressor by applying the correction coefficient to the determined basic operation rate. The correction coefficient may be set to a value that increases as the external air temperature increases.

According to an exemplary embodiment of the present invention, cooling performance of an air conditioning system may be improved by expanding an operation range of the compressor. In addition, fuel efficiency of a vehicle may be improved by adjusting the operation rate of the compressor based on the vehicle speed, the engine speed, the position value of the accelerator pedal, and the external air temperature.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF SYMBOLS

10: data detector
12: vehicle speed sensor
14: engine speed sensor
16: accelerator pedal position sensor
18: external air temperature sensor
20: engine
30: air conditioning system
32: compressor
34: condenser
36: evaporator
40: controller
42: engine controller
44: heater controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully with reference to the accompanying drawings, in which exemplary embodiments of the invention are shown. However, the present invention is not limited to the exemplary embodiments which are described herein, and may modified in various different ways. Since each component shown in the drawings is arbitrarily illustrated for easy description, the present invention is not particularly limited to the components illustrated in the drawings.

Figure 1:
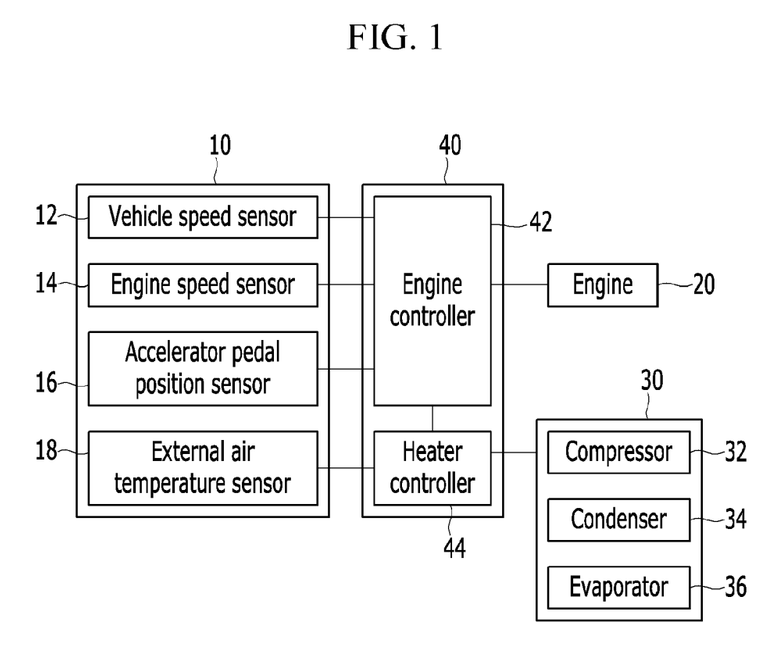
FIG. 1 is a block diagram of an apparatus for controlling a compressor according to an exemplary embodiment of the present invention.

FIG. 1 is a block diagram of an apparatus for controlling a compressor according to an exemplary embodiment of the present invention. As shown in FIG. 1, an apparatus for controlling a compressor according to an exemplary embodiment of the present invention may include a data detector 10 and a controller 40.

The data detector 10 may be configured to detect data for controlling (e.g., operating) a compressor 32, and may be configured to transmit the data detected by the data detector 10 to the controller 40. The data detector 10 may include a vehicle speed sensor 12, an engine speed sensor 14, an accelerator pedal position sensor 16, and an external air temperature sensor 18. The data detector 10 may further include various sensors (e.g., a brake pedal sensor, an exhaust temperature sensor, and an oxygen sensor) configured to operate an engine 20. Particularly, the vehicle speed sensor 12 may be configured to measure or sense a vehicle speed, and transmit a signal corresponding thereto to an engine controller 42. The engine speed sensor 14 may be configured to measure or sense an engine speed, and transmit a signal corresponding thereto to the engine controller 42.

Further, the accelerator pedal position sensor 16 may be configured to measure or sense a position value of an accelerator pedal (i.e., an engagement degree of the accelerator pedal or the amount of pressure exerted onto the pedal), and transmit a signal corresponding thereto to the engine controller 42. When the accelerator pedal is completely engaged, the position value of the accelerator pedal is 100%, and when the accelerator pedal is disengaged (e.g., no pressure is exerted onto the pedal), the position value of the accelerator pedal is 0%. The external air temperature sensor 18 may be configured to measure or sense an external air temperature of a vehicle, and transmit a signal corresponding thereto to a heater controller 44. The engine 20 may be configured to combust a fuel to generate torque, and various engines such as a gasoline engine, a diesel engine, and a liquefied petroleum injection (LPI) engine may be used as the engine 20. The engine 20 may then be configured to supply power to the compressor 32.

An air conditioning system 30 may be used for warming, ventilating, and cooling the cabin of the vehicle. The air conditioning system 30 may include the compressor 32, a condenser 34, and an evaporator 36. The compressor 32 may be configured to compress a refrigerant flowing in from the evaporator 36. Compressors of variable-capacity types are widely used for vehicles. The compressor 32 may include a pressure control valve, and pressure of the refrigerant may be adjusted by the pressure control valve. As an operation rate of the compressor 32 is increased, cooling performance may be increased. The condenser 34 may be configured to condense and liquefy the compressed refrigerant. The evaporator 36 may be configured to evaporate the liquefied refrigerant. Such an air conditioning system 30 is well known to a person of ordinary skill in the art, and a detailed description thereof will be omitted.

The controller 40 may include the engine controller 42 and the heater controller 44. The engine controller 42 may be configured to operate the engine 20 based on the data detected by the data detector 10. For this purpose, the engine controller 42 may be implemented with one or more processors executed by a predetermined program, and the predetermined program may include a series of commands for performing each step included in a method for controlling the engine 20. The engine controller 42 may be connected to the heater controller 44 via in-vehicle communication (e.g., via a controller area network (CAN)). The engine controller 42 may be configured to transmit the vehicle speed, the engine speed, and the position value of the accelerator pedal to the heater controller 44.

Further, the heater controller 44 may be configured to operate the air conditioning system 30 based on the data detected by the data detector 10. In particular, the heater controller 44 may be configured to determine the operation rate of the compressor 32 based on the vehicle speed, the engine speed, the position value of the accelerator pedal, and the external air temperature. For this purpose, the heater controller 44 may be implemented with one or more processors executed by a predetermined program, and the predetermined program may include a series of commands for performing each step included in a method for controlling the air conditioning system 30.

Among processes of a method for controlling a compressor according to an exemplary embodiment of the present invention, which will be described later, some processes may be performed by the engine controller 42 and some other processes may be performed by the heater controller 44. Therefore, since a method for controlling a compressor according to an exemplary embodiment of the present invention may be described by defining the engine controller 42 and the heater controller 44 as a single controller 40, the engine controller 42 and the heater controller 44 will be referred to as the controller 40 in the present specification.

Figure 2:
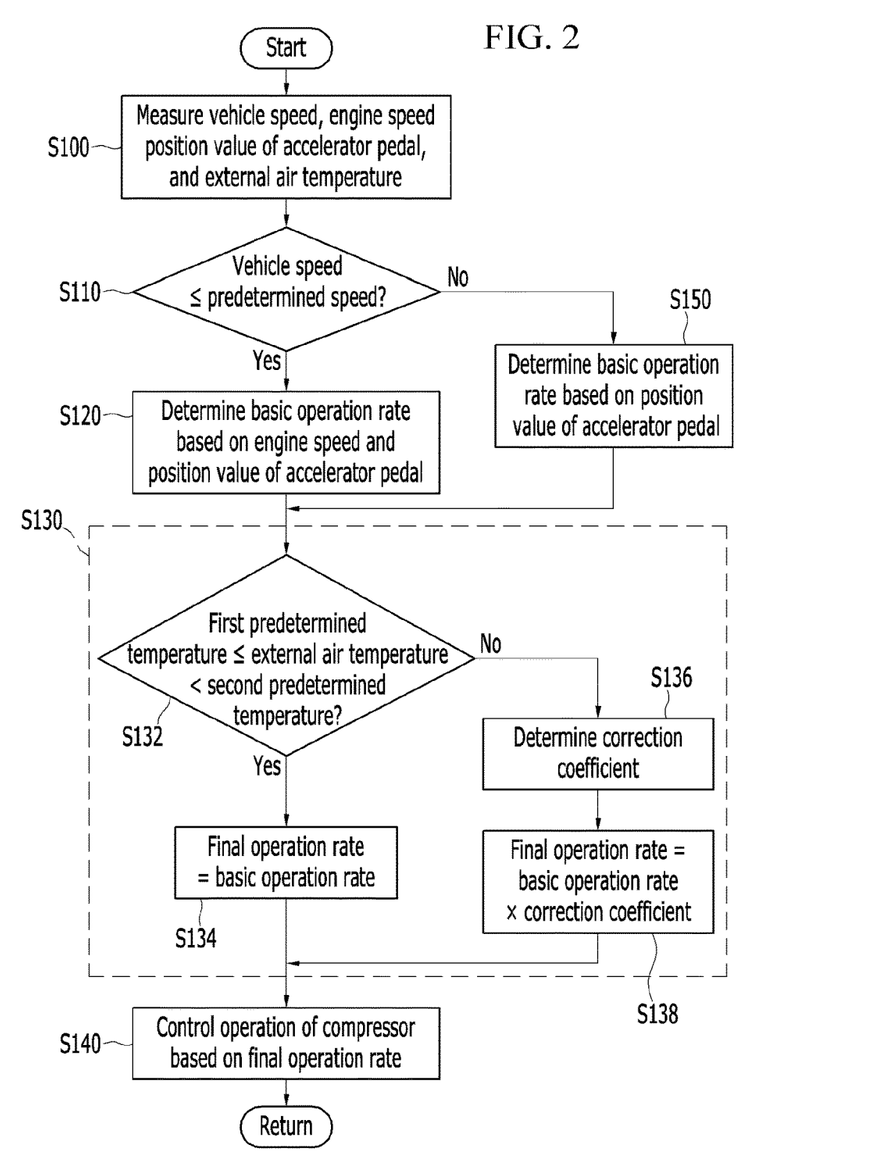
FIG. 2 is a flowchart of a method for controlling a compressor according to an exemplary embodiment of the present invention.

Hereinafter, a method for controlling a compressor according to an exemplary embodiment of the present invention will be described in detail with reference to FIG. 2 to FIG. 4. FIG. 2 is a flowchart of a method for controlling a compressor according to an exemplary embodiment of the present invention, FIG. 3 is a diagram showing a first operation rate map according to an exemplary embodiment of the present invention, and FIG. 4 is a diagram showing a second operation rate map according to an exemplary embodiment of the present invention.

As shown in FIG. 2, a method for controlling a compressor according to an exemplary embodiment of the present invention may begin with measuring the vehicle speed, the engine speed, the position value of the accelerator pedal, and the external air temperature at step S100 using various sensors. Particularly, the vehicle speed sensor 12 may be configured to measure the vehicle speed, the engine speed sensor 14 may be configured to measure the engine speed, the accelerator pedal position sensor 16 may be configured to measure the position value of the accelerator pedal, and the external air temperature sensor 18 may be configured to measure the external air temperature. The controller 40 may then be configured to compare the vehicle speed with a predetermined speed at step S110. The predetermined speed may be set to a value to determine whether the vehicle is propelled. For example, the predetermined speed may be about 15 KPH.

When the vehicle speed is equal to or less than the predetermined speed at step S110, the controller 40 may be configured to determine a basic operation rate of the compressor 32 based on the engine speed and the position value of the accelerator pedal at step S120. For example, the controller 40 may be configured to determine the basic operation rate of the compressor 32 using a first operation map Map1 based on the engine speed and the position value of the accelerator pedal. The first operation rate map Map1 shown in FIG. 3 is merely an example for describing the exemplary embodiment of the present invention, and the present invention is not limited thereto.

Figure 3:
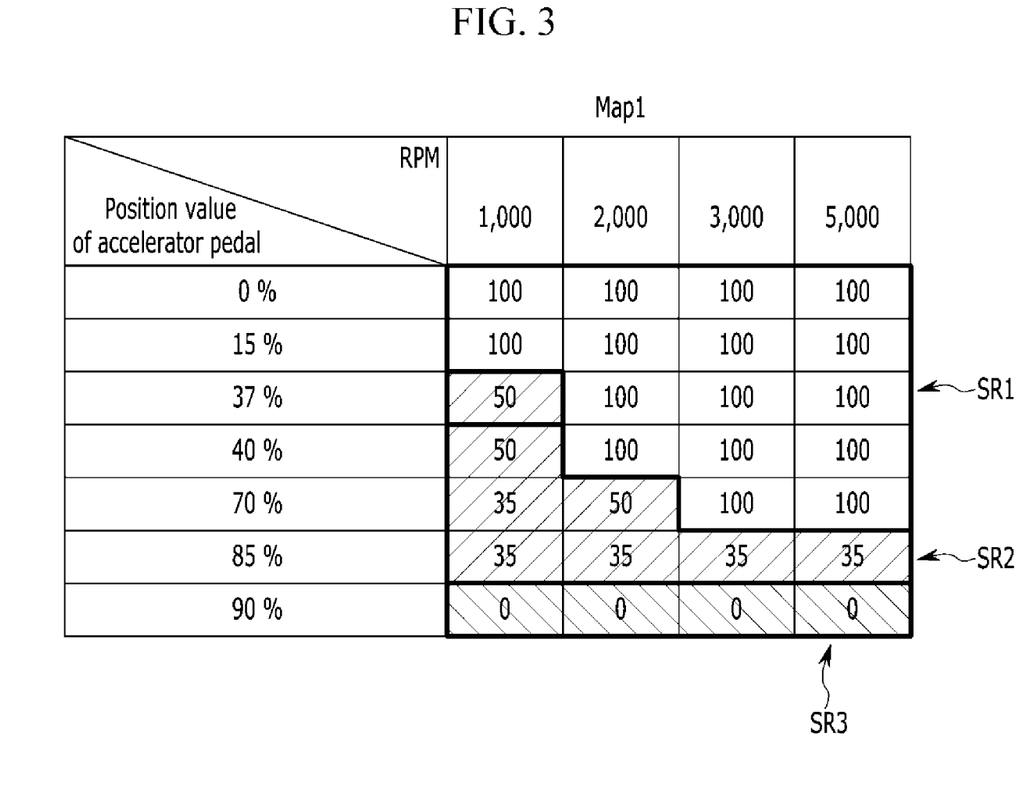
FIG. 3 is a diagram showing a first operation rate map according to an exemplary embodiment of the present invention.
Figure 4:
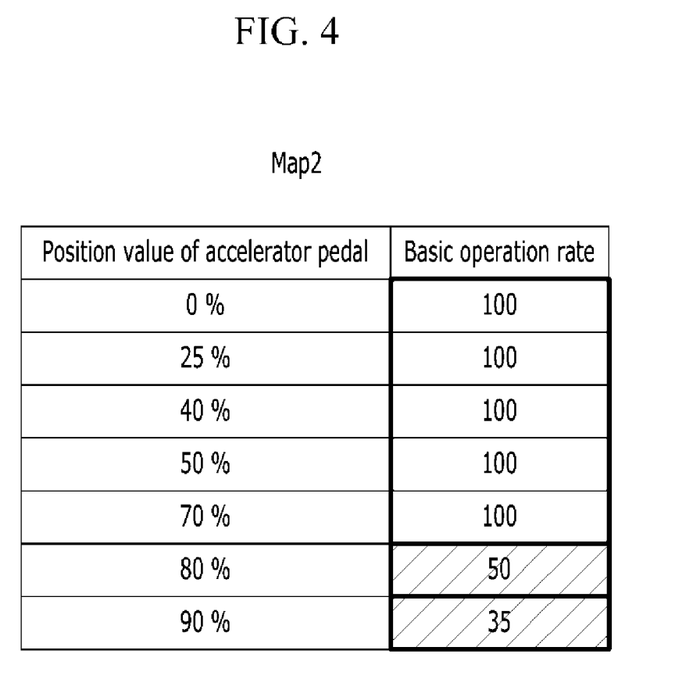
FIG. 4 is a diagram showing a second operation rate map according to an exemplary embodiment of the present invention.

As shown in FIG. 3, the basic operation rate of the compressor 32 based on the engine speed and the position value of the accelerator pedal may be set in the first operation rate map Map1. The first operation rate map Map1 may include a plurality of sub-regions. FIG. 3 illustrates that the first operation rate map Map1 may be divided into three sub-regions SR1, SR2 and SR3, but the present invention is not limited thereto. When the engine speed and the position value of the accelerator pedal correspond to a first sub-region SR1, the controller 40 may be configured to determine the basic operation rate of the compressor 32 as a maximum operation rate of the compressor 32. The maximum operation rate of the compressor 32 is 100%.

When the engine speed and the position value of the accelerator pedal correspond to a second sub-region SR2, the controller 40 may be configured to determine the basic operation rate of the compressor 32 as a value between the maximum operation rate and a minimum operation rate of the compressor 32. The value between the maximum operation rate and the minimum operation rate may be about 50% or 35%. When the engine speed and the position value of the accelerator pedal correspond to a third sub-region SR3, the controller 40 may be configured to determine the basic operation rate of the compressor 32 as the minimum operation rate of the compressor 32. The minimum operation rate of the compressor 32 is 0%.

Additionally, the controller 40 may be configured to determine a final operation rate of the compressor 32 based on the external air temperature and the determined basic operation rate at step S130. The controller 40 may be configured to determine whether the external air temperature is within a predetermined temperature range at step S132. Particularly, the controller 40 may be configured to determine whether the external air temperature is between a first predetermined temperature and a second predetermined temperature. The first predetermined temperature and the second predetermined temperature are reference values used to determine whether to correct the determined basic operation rate, and may be set by a person of ordinary skill in the art. For example, the first predetermined temperature may be about 10° C., and the second predetermined temperature may be about 35° C.

When the external air temperature is within the predetermined temperature range at step S132, the controller 40 may be configured to determine the final operation rate of the compressor 32 as the determined basic operation rate at step S134. When the external air temperature is beyond the predetermined temperature range at step S132, the controller 40 may be configured to determine a correction coefficient based on the external air temperature at step S136. Table 1 shows an example of the correction coefficient. Table 1 is merely an example for describing the exemplary embodiment of the present invention, and the present invention is not limited thereto.

TABLE 1

| | External air temperature (T) | | | | |
|---|---|---|---|---|---|
| | T < 10° C. | 10° C. ≤ T < 20° C. | 40° C. ≤ T < 45° C. | 45° C. ≤ T < 50° C. | 50° C. ≤ T |
| Correction coefficient | 0.8 | 0.9 | 1.3 | 1.4 | 1.5 |

Furthermore, the controller 40 may be configured to the final operation rate of the compressor 32 by applying the determined correction coefficient to the determined basic operation rate. Particularly, the final operation rate may be calculated by multiplying the determined basic operation rate by the determined correction coefficient. The correction coefficient may be set to a value that increases as the external air temperature increases. Accordingly, when the external air temperature is high (i.e., high cooling performance is required), the operation rate of the compressor 32 may be increased. When the external air temperature is low (i.e., low cooling performance is required), the operation rate of the compressor 32 may be decreased. When the determined basic operation rate is the maximum operation rate of the compressor 32, even though the correction coefficient (e.g., 1.3, 1.4, or 1.5) is applied to the determined basic operation rate, the final operation rate may be determined as the maximum operation rate. The controller 40 may then be configured to operate the compressor 32 based on the determined final operation rate at step S140.

Meanwhile, when the vehicle speed is greater than the predetermined speed at step S110, the controller 40 may be configured to determine the basic operation rate of the compressor 32 based on the position value of the accelerator pedal at step S150. For example, the controller 40 may be configured to determine the basic operation rate of the compressor 32 using a second operation rate map Map2 based on the position value of the accelerator pedal. The second operation rate map Map2 shown in FIG. 4 is merely an example for describing the exemplary embodiment of the present invention, and the present invention is not limited thereto. As shown in FIG. 4, the basic operation rate of the compressor 32 based on the position value of the accelerator pedal may be set in the second operation rate map Map2.

As described above, according to an exemplary embodiment of the present invention, cooling performance of the air conditioning system 30 may be improved by expanding an operation range of the compressor 32. In addition, fuel efficiency of the vehicle may be improved by adjusting the operation rate of the compressor 32 based on the vehicle speed, the engine speed, the position value of the accelerator pedal, and the external air temperature.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A column housing for a vehicle steering system, which is coupled outside a column tube of a steering column for the vehicle steering system, the column housing comprising:

a slit which is formed to be elongated in a predetermined direction so that the column housing is deformed inward when the column housing is pressed on and fixed to the column tube positioned inside the column housing; and a first reinforcing portion which is formed so as to protrude outward at a predetermined portion from an end position of an end portion of the slit to the periphery of the slit where the slit is not formed, and has a shape having an increased thickness relative to other portions of the column housing, wherein the first reinforcing portion is formed only at a portion of the column housing, which corresponds to a predetermined section A from an end portion of the slit to an end portion of the column housing in the longitudinal direction of the column housing, the portion corresponding to the predetermined section A where the slit is not formed.

2. The column housing of claim 1, wherein a first slit formed in a circumferential direction of the column housing, and a second slit formed from the first slit in a longitudinal direction of the column housing are provided, and the first reinforcing portion is formed at a predetermined portion from an end position of an end portion opposite to an end portion connected with the first slit between both end portions of the second slit to the periphery of the second slit where the second slit is not formed.

3. The column housing of claim 1, wherein second reinforcing portions protrude laterally from an outer surface of a portion, to which a steering lock device is coupled, so as to reinforce the portion to which the steering lock device is coupled.

4. The column housing of claim 3, wherein the second reinforcing portions protrude laterally from both left and right sides of the outer surface of the column housing, respectively.

5. The column housing of claim 4, wherein the second reinforcing portions, which protrude laterally from both left and right sides of the outer surface, respectively, have joint surfaces which are joined to a fastening bracket for mounting the steering lock device, and the steering lock device is fixed as the fastening bracket is fastened in a state in which the fastening bracket is joined to the joint surfaces of the second reinforcing portions.

6. The column housing of claim 5, wherein fastening holes are formed in the second reinforcing portions, such that a fastening member is inserted into and fastened to the fastening holes of the second reinforcing portions and a fastening hole formed in the fastening bracket of the steering lock device.

7. The column housing of claim 3, wherein the first reinforcing portion is formed to correspond to a section defined in a longitudinal direction of the column housing from an end position of an end portion of the slit, the second reinforcing portions are formed to correspond to a section defined in the longitudinal direction of the column housing at an outer surface of a portion to which the steering lock device is coupled, and within a section in the longitudinal direction of the column housing, the section in which the second reinforcing portions are formed includes the section in which the first reinforcing portion is formed.

8. The column housing of claim 3, wherein the first reinforcing portion is formed to correspond to a section defined in a longitudinal direction of the column housing from an end position of an end portion of the slit, the second reinforcing portions are formed to correspond to a section defined in the longitudinal direction of the column housing at an outer surface of a portion to which the steering lock device is coupled, and within a section in the longitudinal direction of the column housing, the section in which the second reinforcing portions are formed includes the section in which the first reinforcing portion is formed, and overlaps with at least a part of a section in which the slit is formed.

9. The column housing of claim 1, wherein the column housing is made of synthetic resin.

10. A column housing for a vehicle steering system, which is coupled outside a column tube of a steering column for the vehicle steering system, the column housing comprising:

a slit which is formed to be elongated in a predetermined direction so that the column housing is deformed inward when the column housing is pressed on and fixed to the column tube positioned inside the column housing; and a first reinforcing portion which is formed so as to protrude outward at a predetermined portion and has a shape having an increased thickness relative to other portions of the column housing, wherein the slit includes a first slit and a second slit, the first slit is formed in a circumferential direction of the column housing and the second slit is formed from the first slit in a longitudinal direction of the column housing, and the first reinforcing portion is formed only at a predetermined portion from an end position of an end portion opposite to an end portion connected with the first slit between both end portions of the second slit to the periphery of the second slit where the second slit is not formed.

11. The column housing of claim 10, wherein a section B of a second reinforcing portion includes a section A of the first reinforcing portion which is from an end portion of the slit to an end portion of the column housing in the longitudinal direction of the column housing and overlaps with at least a part of a section C of the second slit such that the portion of the column housing where the first reinforcing portion is formed is reinforced by the first reinforcing portion and the second reinforcing portions, thereby dispersing force applied from the outside.

* * * * *